(12) United States Patent
Lin

(10) Patent No.: US 10,802,333 B2
(45) Date of Patent: *Oct. 13, 2020

(54) LOCAL DIMMING SYSTEM AND METHOD ADAPTABLE TO A BACKLIGHT OF A DISPLAY

(71) Applicant: Himax Technologies Limited, Tainan (TW)

(72) Inventor: Yun-Sheng Lin, Tainan (TW)

(73) Assignee: Himax Technologies Limited, Tainan (TW)

(*) Notice: Subject to any disclaimer, the term of this patent is extended or adjusted under 35 U.S.C. 154(b) by 164 days.

This patent is subject to a terminal disclaimer.

(21) Appl. No.: 16/107,938

(22) Filed: Aug. 21, 2018

(65) Prior Publication Data

US 2020/0064688 A1    Feb. 27, 2020

(51) Int. Cl.
*G09G 3/34* (2006.01)
*G02F 1/13357* (2006.01)
*G09G 3/36* (2006.01)
*H05B 45/10* (2020.01)
*H05B 45/37* (2020.01)

(52) U.S. Cl.
CPC ......... *G02F 1/133603* (2013.01); *G09G 3/36* (2013.01); *H05B 45/10* (2020.01); *H05B 45/37* (2020.01); *G09G 2320/0626* (2013.01); *G09G 2330/021* (2013.01)

(58) Field of Classification Search
CPC .............................................. G09G 2320/0626
See application file for complete search history.

(56) References Cited

U.S. PATENT DOCUMENTS

| | | | | |
|---|---|---|---|---|
| 2009/0002285 A1* | 1/2009 | Baba | ..................... | G09G 3/3406 345/77 |
| 2011/0141090 A1* | 6/2011 | Hong | ................... | G09G 3/3426 345/211 |
| 2011/0169852 A1* | 7/2011 | Yu | ........................... | G09G 3/342 345/589 |
| 2012/0133673 A1* | 5/2012 | Ninan | .................. | G09G 3/3426 345/599 |
| 2012/0133685 A1* | 5/2012 | Cho | ...................... | G09G 3/3426 345/690 |
| 2012/0139955 A1* | 6/2012 | Jaffari | .................. | G09G 3/3258 345/690 |
| 2015/0062186 A1* | 3/2015 | Park | ..................... | G09G 3/3225 345/690 |

\* cited by examiner

*Primary Examiner* — Roy P Rabindranath
(74) *Attorney, Agent, or Firm* — Donald E. Stout; Stout, Uxa & Buyan, LLP

(57) ABSTRACT

A local dimming system includes a light shape imitation (LSI) unit that receives a pulse-width modulation (PWM) value generated according to content of an image, the LSI unit generating luminance gain according to the PWM value; and a pixel compensation unit that performs pixel compensation on the image according to the luminance gain, thereby resulting in a compensated image. The LSI unit performs LSI computation by multiplying profile data with corresponding PWM values, and adding products of multiplication, thus resulting in a light shape.

20 Claims, 11 Drawing Sheets

| HGL0 | HGL0 | HGL0 | HGL1 | HGL2 |
| --- | --- | --- | --- | --- |
| HGL0 | HGL0 | HGL0 | HGL1 | HGL2 |
| HGL0 | HGL0 | HGL0 | HGL1 | HGL2 |
| HGL48 | HGL48 | HGL48 | HGL49 | HGL50 |
| HGL96 | HGL96 | HGL96 | HGL97 | HGL98 |

*FIG. 5A*

| s11 | s12 | s13 | s14 | s15 |
| --- | --- | --- | --- | --- |
| s21 | s22 | s23 | s24 | s25 |
| s31 | s32 | s33 | s34 | s35 |
| s41 | s42 | s43 | s44 | s45 |
| s51 | s52 | s53 | s54 | s55 |

*FIG. 5B*

LOCAL DIMMING SYSTEM AND METHOD ADAPTABLE TO A BACKLIGHT OF A DISPLAY

BACKGROUND OF THE INVENTION

1. Field of the Invention

The present invention generally relates to backlight dimming, and more particularly to a local dimming system and method adaptable to a light-emitting diode backlight of a liquid crystal display.

2. Description of Related Art

As liquid crystal displays (LCDs) do not produce light themselves, a backlight is required to provide illumination to the LCDs. The light source of the backlight may be composed of light-emitting diodes (LEDs).

In order to improve the contrast, a backlight dimming technique is adopted to dynamically control luminance of the backlight. Global dimming is one type of backlight dimming, in which luminance of entire display panel is controlled at the same time. The global dimming can substantially improve dynamic contrast between two consecutive frames. Local dimming is another type of backlight dimming, in which luminance of partial display panel within one frame is controlled. The local dimming can substantially improve static contrast.

Conventional dimming methods, particularly local dimming methods, suffer luminance unevenness and flickers. More importantly, conventional local dimming methods cannot effectively reduce power consumption. A need has arisen to propose a novel scheme to overcome disadvantages of conventional local dimming methods.

SUMMARY OF THE INVENTION

In view of the foregoing, it is an object of the embodiment of the present invention to provide a local dimming system and method adaptable to a light-emitting diode (LED) backlight of a liquid crystal display (LCD) capable of effectively reducing power consumption. The local dimming system of one embodiment is capable of adjusting dimming speed and preventing flicker.

According to one embodiment, a local dimming system adaptable to a backlight of a display includes a light shape imitation (LSI) unit and a pixel compensation unit. The LSI unit receives a pulse-width modulation (PWM) value generated according to content of an image, and generates luminance gain according to the PWM value. The pixel compensation unit performs pixel compensation on the image according to the luminance gain, thereby resulting in a compensated image. The LSI unit performs LSI computation by multiplying profile data with corresponding PWM values, and adding products of multiplication, thus resulting in a light shape.

BRIEF DESCRIPTION OF THE DRAWINGS

FIG. 5A shows exemplary PWM gain values;

FIG. 5B shows corresponding elements of a spatial filter to be performed on the PWM gain values of FIG. 5A;

DETAILED DESCRIPTION OF THE INVENTION

Figure 1:
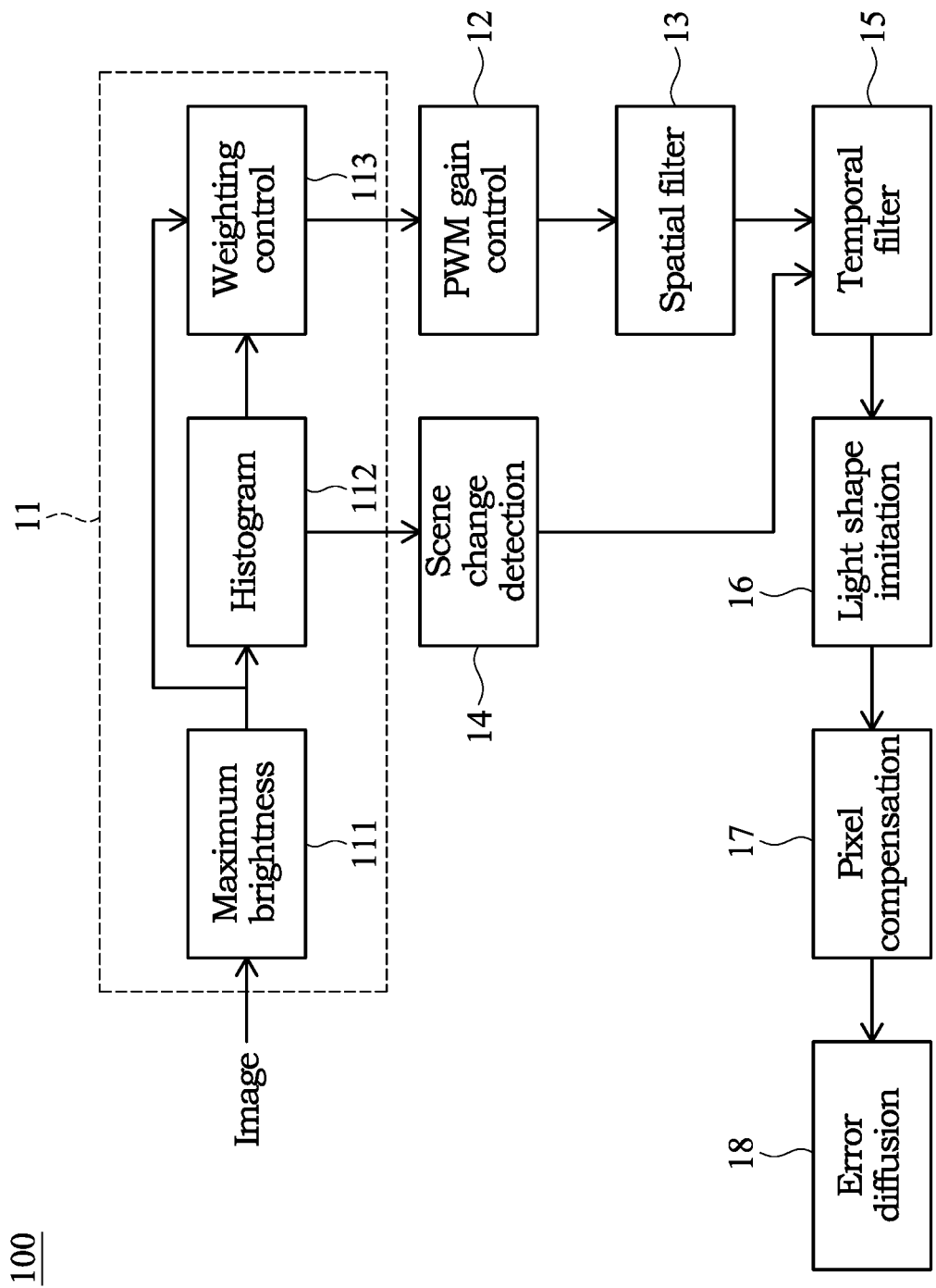
FIG. 1 shows a block diagram illustrating a local dimming system adaptable to a light-emitting diode (LED) backlight of a liquid crystal display (LCD) according to one embodiment of the present invention.

FIG. 1 shows a block diagram illustrating a local dimming system 100 adaptable to a light-emitting diode (LED) backlight of a liquid crystal display (LCD) according to one embodiment of the present invention. The blocks of the local dimming system 100 may be implemented by hardware (e.g., a digital image processor), software (e.g., computer programs) or their combinations.

Figure 2:
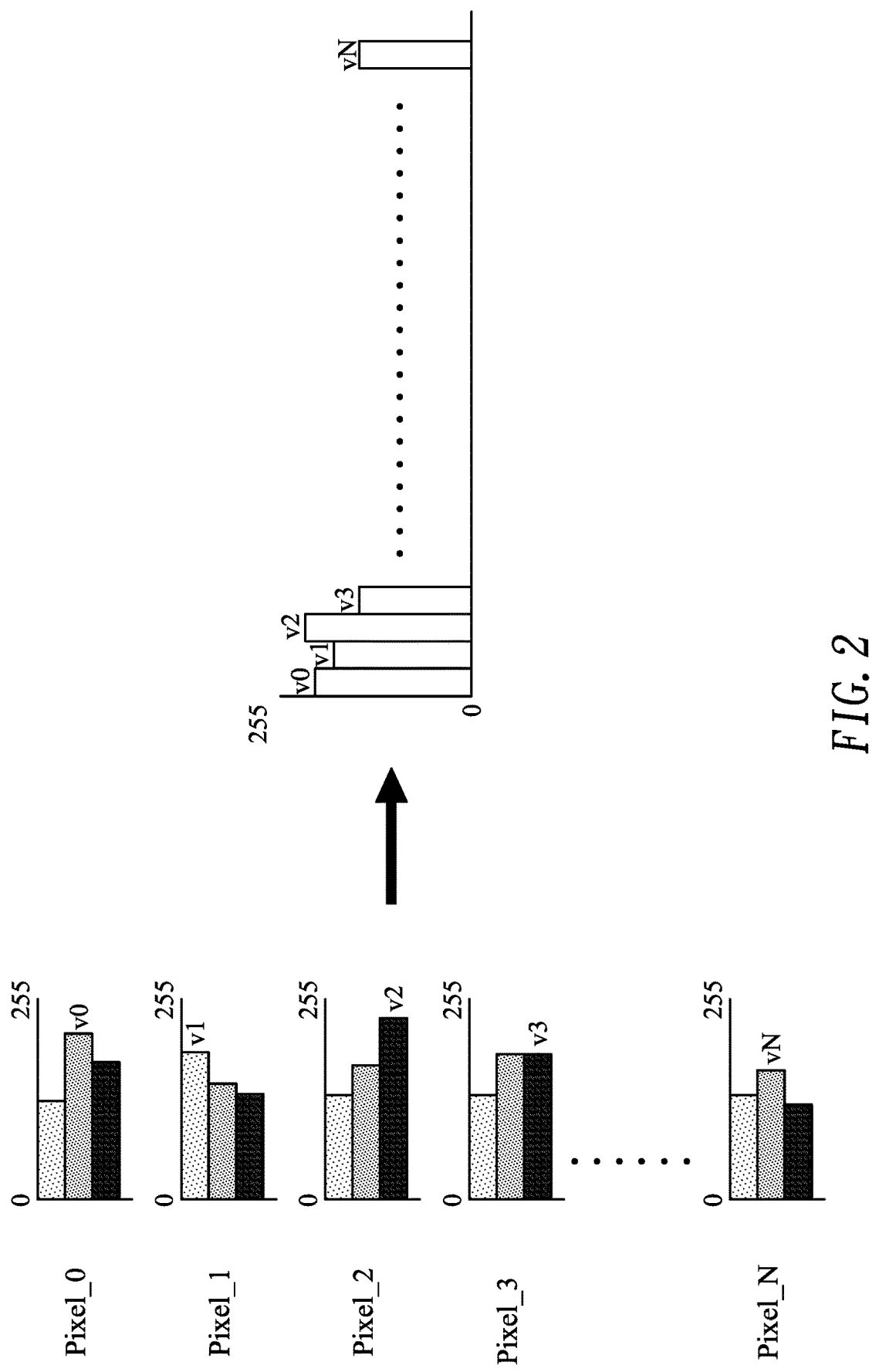
FIG. 2 schematically shows an example of determining maximum brightness of each pixel of the image.

In the embodiment, the local dimming system 100 may include a mean estimation unit 11 configured to receive an image and estimate a mean value thereof. According to one aspect of the embodiment, the mean value may be estimated according to a histogram of the image. Specifically, the mean estimation unit 11 may include a maximum brightness unit 111 configured to determine maximum brightness of each pixel of the image regardless of colors (e.g., red, green and blue). FIG. 2 schematically shows an example of determining maximum brightness of each pixel of the image. As exemplified in FIG. 2, maximum brightness (e.g., v0 for pixel 0, v1 for pixel 1, etc.) of each pixel is determined, and may be demonstrated by a bar graph on the right-hand side. Accordingly, an arithmetic mean value $HGL_{mean}$ may be obtained as follows:

$$HGL_{mean} = \mathrm{floor}\left(\frac{v0 + v1 + v2 + v3 + \ldots + v(N-1)}{N}\right)$$

where floor represents a floor function that takes an input and gives an output the greatest integer that is less than or equal to the input.

Figure 3:
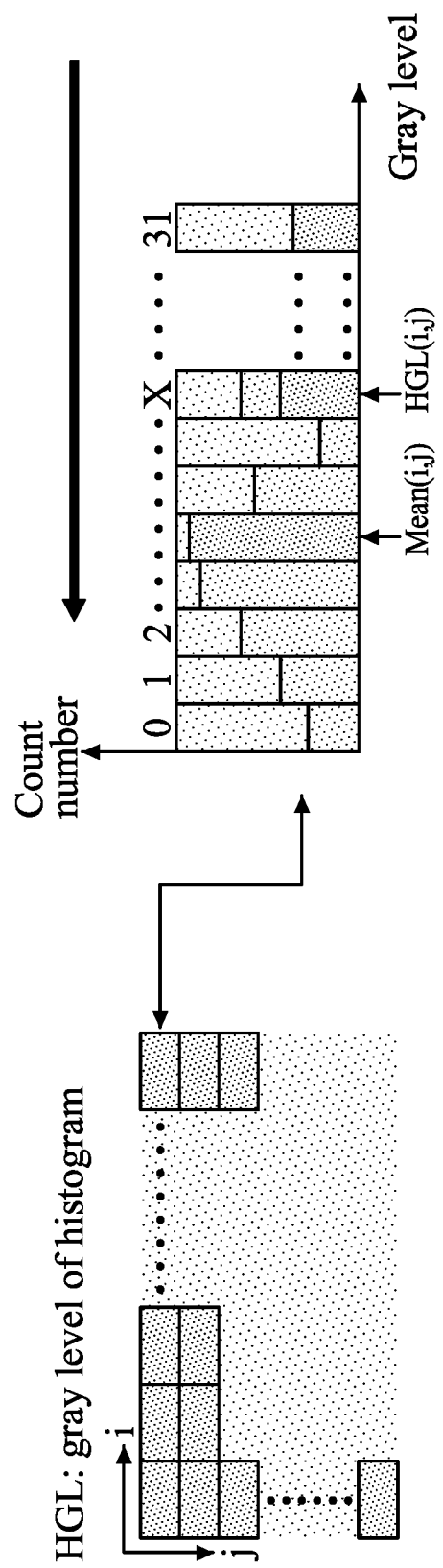
FIG. 3 schematically shows an example of generating a histogram mean value according to the histogram of the image.

The mean estimation unit 11 may include a histogram unit 112 configured to generate a histogram mean value according to the histogram of the image. FIG. 3 schematically shows an example of generating a histogram mean value according to the histogram of the image. As exemplified in FIG. 3, the image is divided into a plurality of blocks, gray levels of which construct a histogram on the right-hand side. The divided blocks may correspond to LEDs of the LED backlight. Next, counts of the gray levels are accumulated from the highest gray level toward the lowest gray level until a predetermined threshold has reached, where the corresponding gray level is set as the histogram mean value $HGL_{high}$, which may be expressed as follows:

if $S31+S30+ \ldots +Sn \geq threshold$ then $HGL_{high}=n$

The mean estimation unit 11 may include a weighting control unit 113 configured to generate the mean value. In the embodiment, the mean value is generated according to the arithmetic mean value $HGL_{mean}$ and the histogram mean value $HGL_{high}$. In one exemplary embodiment, the mean value $HGL_{out}$ may be expressed as follows:

$$HGL_{out} = \max\left(HGL_{mean}, \frac{w_1 \times HGL_{high} + w_2 \times HGL_{mean}}{16}\right)$$

where max is a function that takes two inputs and gives an output the greatest value between the two inputs, and $w_1$ and $w_2$ are weights.

Figure 4A:
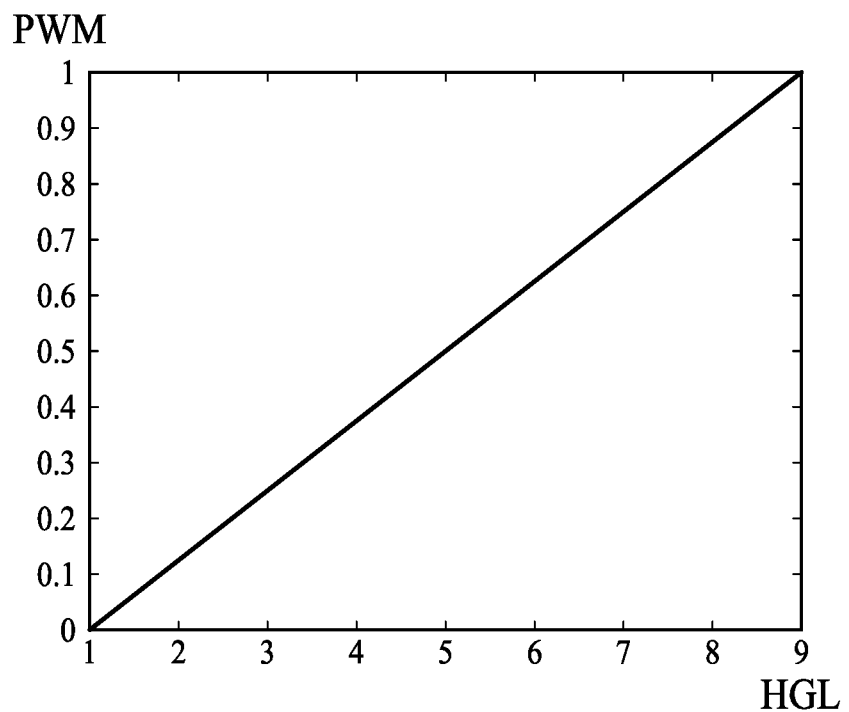
FIG. 4A to FIG. 4C show exemplary relation curves between PWM gain value and mean value.
Figure 4B:
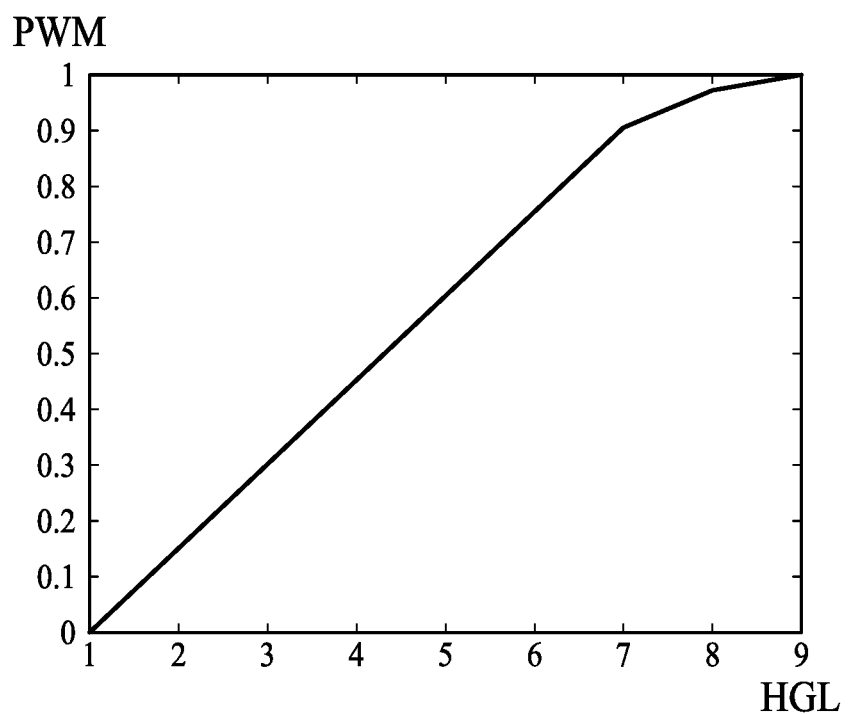
Figure 4C:
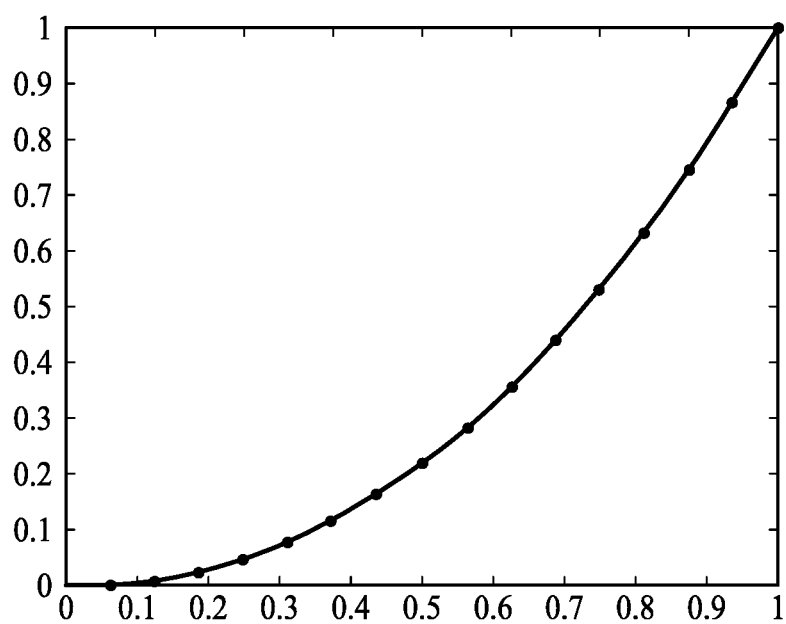

The local dimming system 100 of the embodiment may include a pulse-width modulation (PWM) gain control unit 12 configured to generate PWM gain value according to the mean value (from the mean estimation unit 11). The PWM gain value is used to control power supplied to the LED backlight. The larger the PWM gain value is, the higher the total power supplied to the LED backlight. FIG. 4A shows an exemplary relation curve between PWM gain value and mean value. In this example, linearity exists between PWM gain value and mean value. FIG. 4B shows another exemplary relation curve between PWM gain value and mean value. Linearity also exists in this example except smooth rise at high value. FIG. 4C shows a further exemplary relation curve between PWM gain value and mean value, illustrating nonlinearity of gamma correction. In one embodiment, the PWM gain value may be generated according to a lookup table that is created beforehand, thus saving runtime computation.

The local dimming system 100 of the embodiment may include a spatial filter 13 configured to be performed on the mean values HGL in spatial domain to enhance the PWM gain values, thereby generating enhanced PWM gain values. FIG. 5A shows exemplary PWM gain values and FIG. 5B shows corresponding elements of a spatial filter to be performed on the PWM gain values of FIG. 5A. In one exemplary embodiment, spatial filtering may be performed to generate enhanced PWM gain value HGL' in companion with FIG. 5A and FIG. 5B as follows:

$$HGL'\_tmp1 = \frac{[HGL0\ HGL0\ HGL0\ HGL1\ HGL2\ \ldots\ HGL97\ HGL98] \begin{bmatrix} s11 \\ s12 \\ s13 \\ s14 \\ s15 \\ \vdots \\ s54 \\ s55 \end{bmatrix}}{256}$$

if HGL'_tmp1 ≥ 255 then HGL'_temp1=255
HGL'_tmp2=Max(HGL0, HGL1, ... HGL98)

$$HGL'\_tmp = \frac{wt \times HGL\_tmp2 + (32-wt) \times HGL\_tmp1}{32}$$

if HGL'_tmp<HGL then HGL'=HGL
else HGL'=HGL'_tmp

The local dimming system 100 of the embodiment may include a scene change detection unit 14 configured to detect scene change according to the histogram mean value (from the histogram unit 112).

The local dimming system 100 of the embodiment may include a temporal filter 15 configured to be performed in temporal domain according to the enhanced PWM gain value (from the spatial filer 13) and a result of scene change detection (from the scene change detection unit 14) for the purpose of adjusting dimming speed and preventing flicker (i.e., flickerless), thereby generating PWM values.

According to another aspect of the embodiment, the temporal filter 15 may provide power constraint mode, by which the PWM value may be constrained (or limited) by a maximum value. In the embodiment, the PWM value may be constrained according to a sum of PWM values respectively corresponding to LEDs of the LED backlight.

The local dimming system 100 of the embodiment may include a light shape imitation (LSI) unit 16 configured to generate luminance gain according to the PWM value (from the temporal filter 15), and include a pixel compensation unit 17 configured to perform pixel compensation on the image according to the luminance gain (from the LSI unit 16), thereby resulting in a compensated image. The luminance gain may be expressed as follows:

$$\text{Luminance gain} = (\text{luminance})^{(-1/r)}$$

where r is Gamma value.

In one embodiment, the PWM values are subjected to weighting before feeding to the LSI unit 16 in peaking mode. Suppose current in normal (or original) mode is original_I, current in peaking mode is peaking_I, and PWM value in normal mode is original_PWM, a PWM value in peaking mode denoted as peaking_PWM may be expressed as follow:

$$\text{peaking\_PWM} = \frac{\text{peaking\_I}}{\text{original\_I}} \times \text{original\_PWM}$$

where (peaking_I/original_I) is a peaking weight.

The local dimming system 100 of the embodiment may include an error diffusion unit 18 configured to perform error diffusion on the compensated image. The error diffusion may be performed by truncating at least one least significant bit (LSB), for example, truncating 14 bits to 12 bits, of the compensated image. Accordingly, contour effect may be substantially reduced to improve picture quality.

Figure 6:
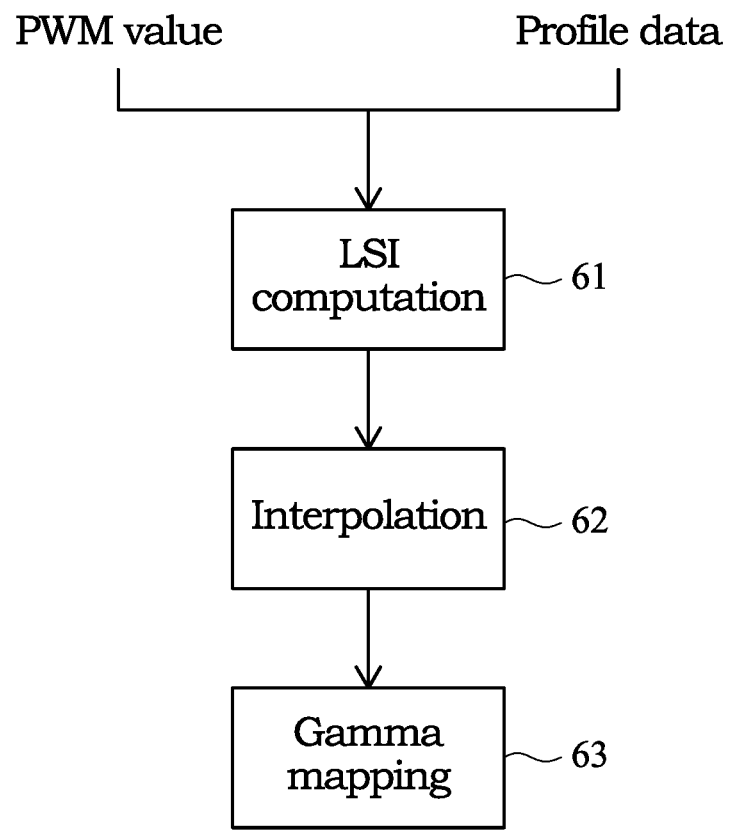
FIG. 6 shows a flow diagram illustrating light shape imitation (LSI) performed by the LSI unit of FIG. 1 according to one embodiment of the present invention.

FIG. 6 shows a flow diagram illustrating light shape imitation (LSI) performed by the LSI unit 16 of FIG. 1 according to one embodiment of the present invention. First, PWM values (generated from the temporal filter 15) and profile data are provided. In the specification, a profile data is illumination irradiated by one LED of the backlight.

Figure 7:
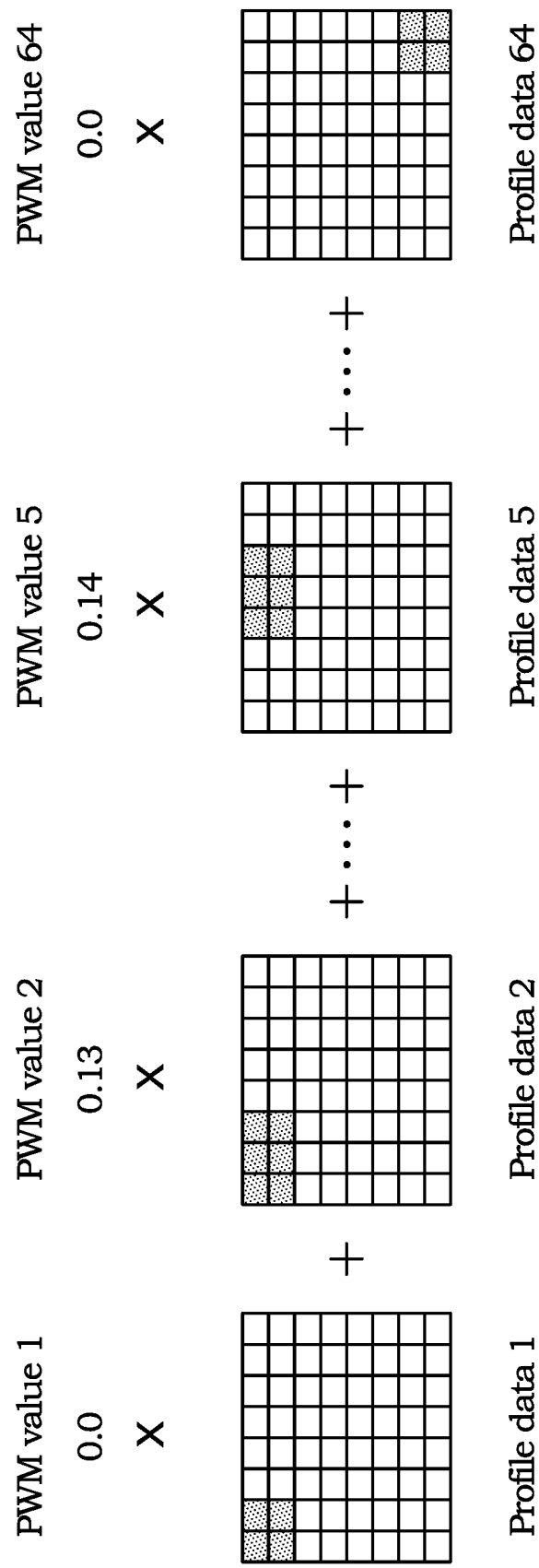
FIG. 7 shows exemplary LSI computation.

In step 61, the PWM values and the profile data are subjected to LSI computation. Specifically, the profile data are multiplied by corresponding PWM values, and products of the multiplication are then added, thus resulting in a light shape. FIG. 7 shows exemplary LSI computation (step 61). As exemplified in FIG. 7, profile data 1 is illumination irradiated by the first LED at the first row of the backlight, profile data 2 is illumination irradiated by the second LED at the first row of the backlight, etc. It is noted that the illumination spreads or diffuses into neighbor blocks.

Figure 8:
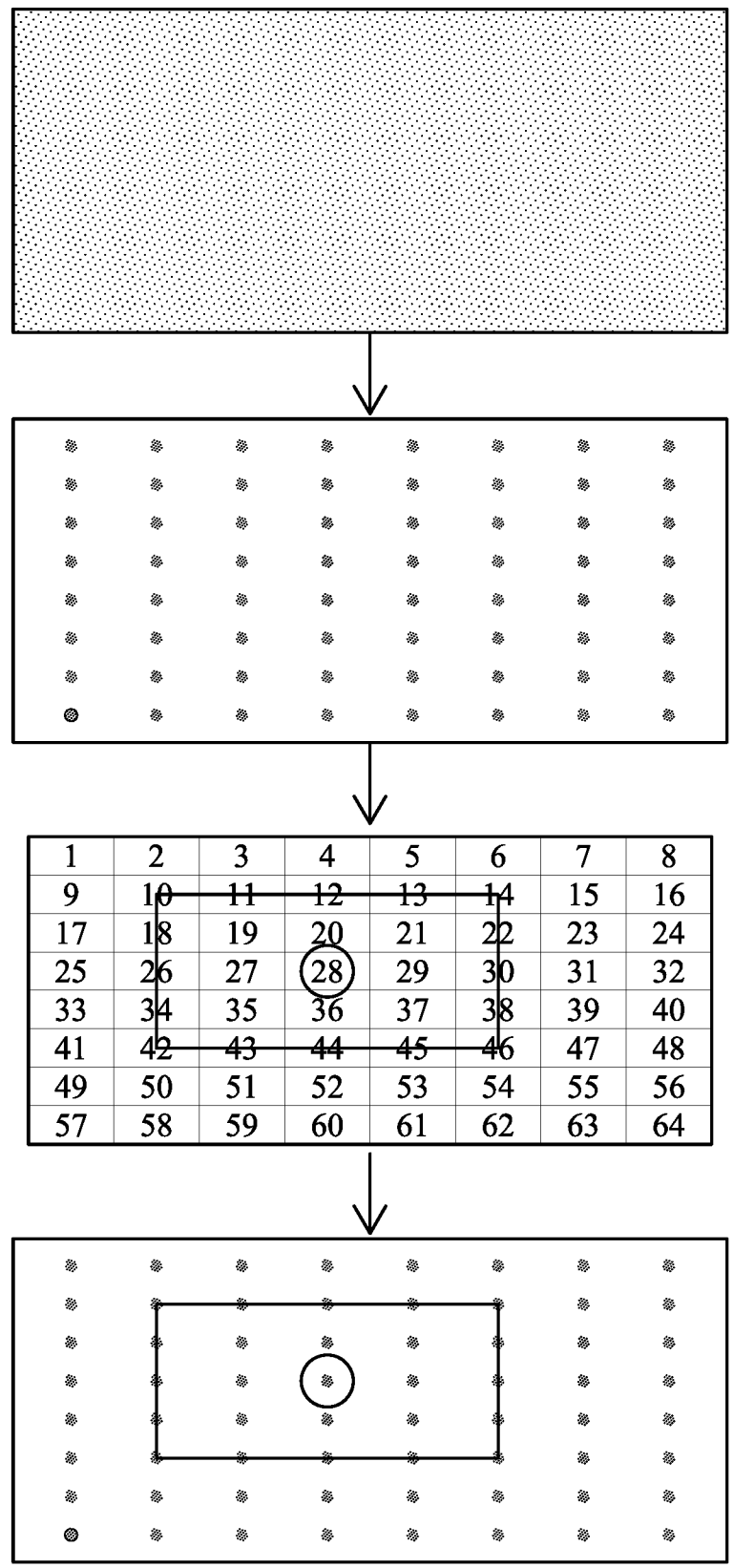
FIG. 8 shows exemplary LSI computation that performs down sampling and restricts the light shape to a predetermined area.

In hardware implementation, the LSI computation (step 61) may be down sampled. Moreover, the light shape may be restricted to a predetermined area, instead of entire backlight. FIG. 8 shows exemplary LSI computation that performs down sampling and restricts the light shape to a predetermined area. In one embodiment, the restriction of the light shape may be executed by a filter.

Referring back to FIG. 6, in step 62, the light shape computed in step 61 is subjected to interpolation such as Bicubic interpolation, thus resulting in an interpolated light shape. Finally, in step 63, the interpolated light shape is subjected to Gamma mapping, thus resulting in an imitated light shape.

Figure 9:
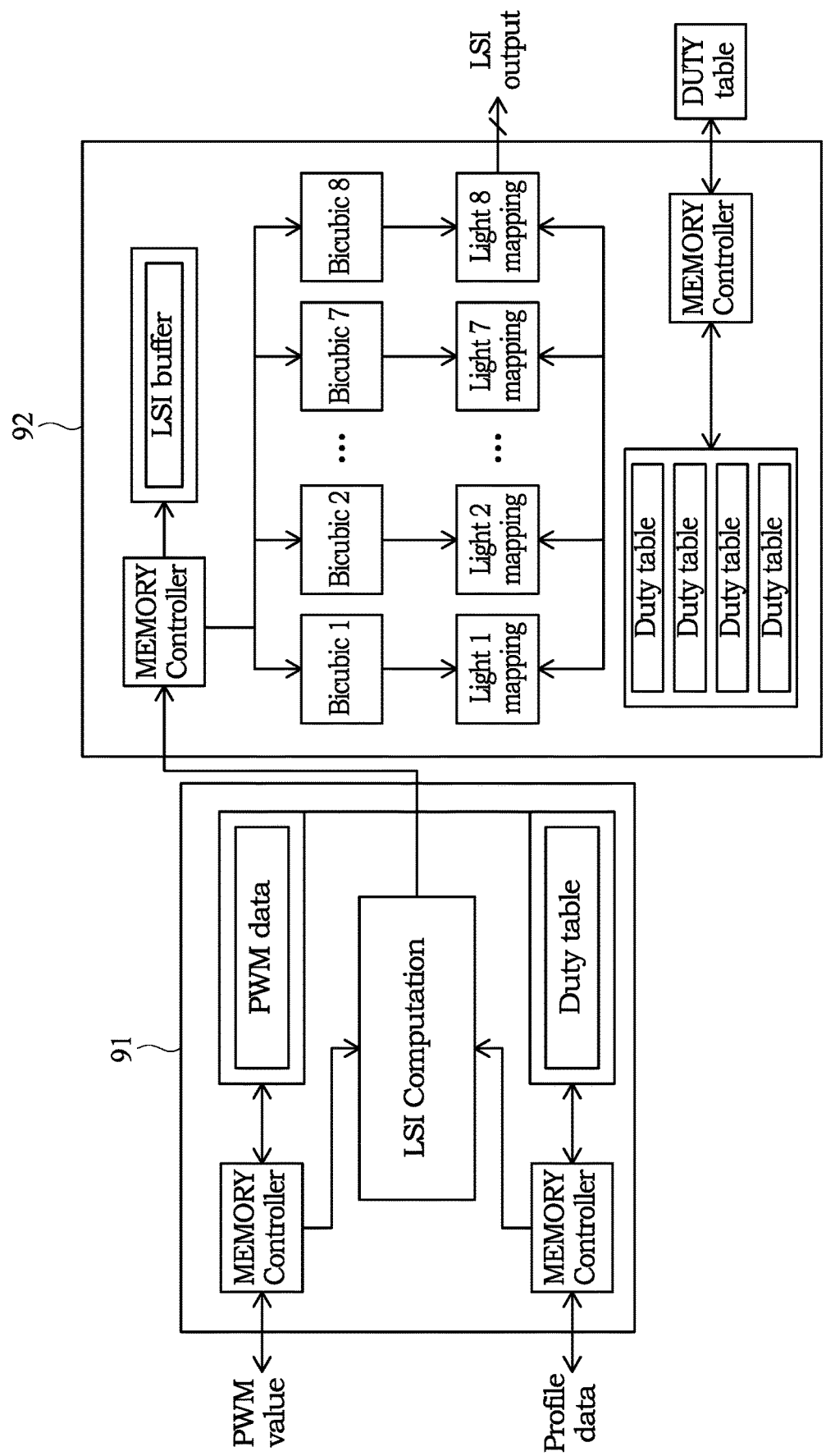
FIG. 9 shows a block diagram illustrating the LSI unit of FIG. 1 according to one embodiment of the present invention.

FIG. 9 shows a block diagram illustrating the LSI unit 16 of FIG. 1 according to one embodiment of the present invention. Specifically, block 91 is adopted to perform LSI computation (step 61) and block 92 is adopted to perform interpolation such as Bicubic interpolation (step 62) and Gamma mapping (step 63).

Figure 10A:
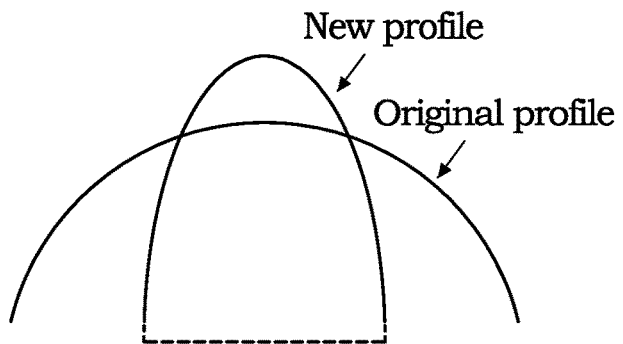
FIG. 10A schematically shows an original profile and a new profile caused by the restriction of the light shape.
Figure 10B:
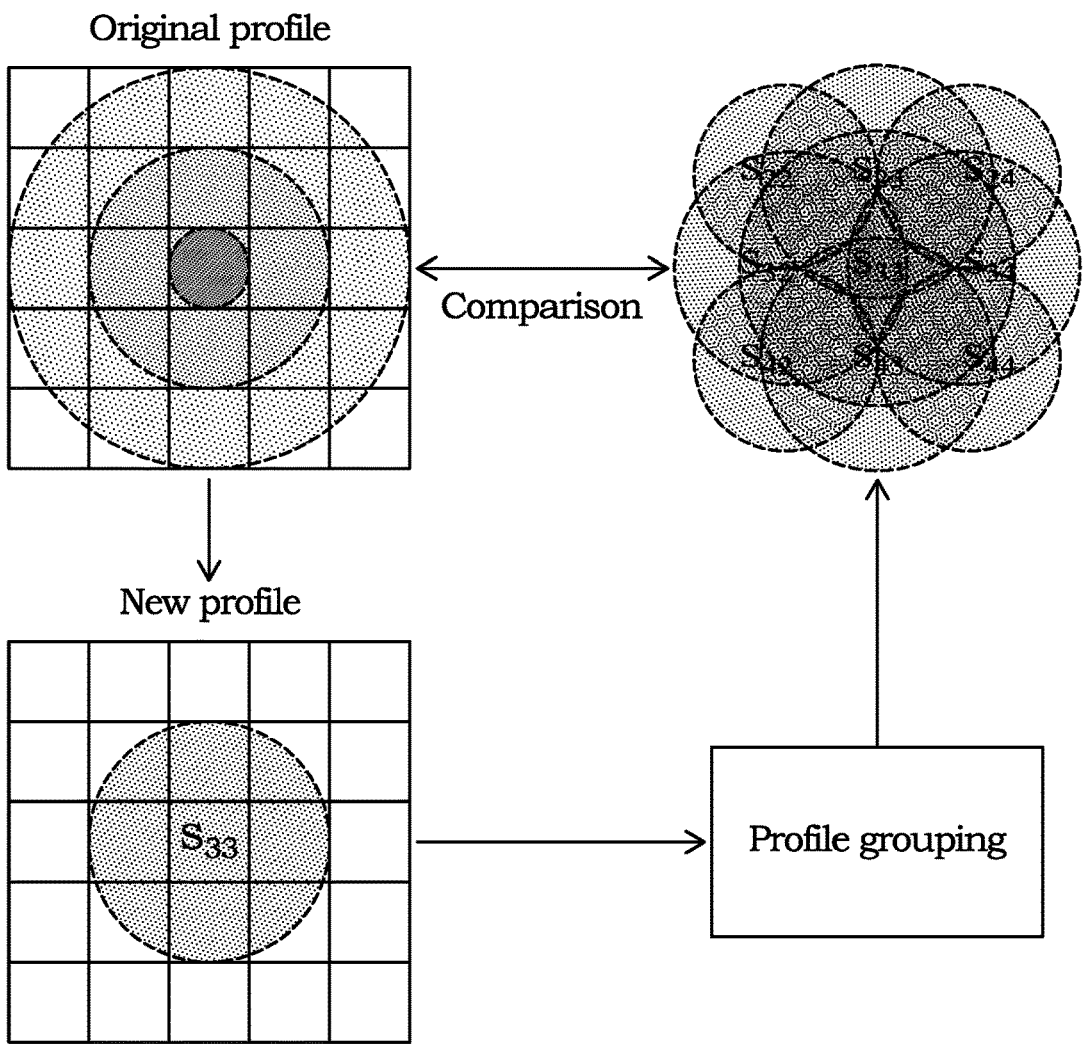
FIG. 10B schematically exemplifies profile grouping for recovering the original profile.

Regarding the restriction of the light shape mentioned above, it is noted that an associated profile may be changed due to the restriction. FIG. 10A schematically shows an original profile and a new profile caused by the restriction of the light shape. In order to recover the original profile, a profile grouping scheme is proposed as schematically exemplified in FIG. 10B. In the embodiment, the profile grouping may be executed by linear equations.

Although specific embodiments have been illustrated and described, it will be appreciated by those skilled in the art that various modifications may be made without departing from the scope of the present invention, which is intended to be limited solely by the appended claims.

What is claimed is:

1. A local dimming system adaptable to a backlight of a display, the system comprising:
    a mean estimation unit that receives an image and estimates a mean value thereof;
    a pulse-width modulation (PWM) gain control unit that generates a PWM gain value according to the mean value;
    a spatial filter that performs on a plurality of the mean values in spatial domain to enhance a plurality of the PWM gain values, thereby generating enhanced PWM gain values;
    a scene change detection unit that detects scene change according to a histogram mean value generated by the mean estimation unit;
    a temporal filter that performs in temporal domain according to the enhanced PWM gain values and a result of scene change detection, thereby generating PWM values;
    a light shape imitation (LSI) unit that generates luminance gains according to the PWM values; and
    a pixel compensation unit that performs pixel compensation on the image according to the luminance gains, thereby resulting in a compensated image;
    wherein the LSI unit performs LSI computation by multiplying profile data with corresponding PWM values, and adding products of multiplication, thus resulting in a light shape.

2. The system of claim 1, wherein the LSI unit further performs the following step:
    subjecting the light shape to interpolation, thus resulting in an interpolated light shape.

3. The system of claim 2, wherein the interpolation comprises Bicubic interpolation.

4. The system of claim 2, wherein the LSI unit further performs the following step:
    subjecting the interpolated light shape to Gamma mapping, thus resulting in an imitated light shape.

5. The system of claim 1, wherein the backlight comprises a light-emitting diode (LED) backlight.

6. The system of claim 5, wherein the profile data is illumination irradiated by one LED of the LED backlight.

7. The system of claim 1, wherein the LSI computation is down sampled.

8. The system of claim 1, wherein the light shape is restricted to a predetermined area, instead of entire backlight.

9. The system of claim 8, wherein the light shape is restricted by a filter.

10. The system of claim 1, wherein the display comprises a liquid crystal display (LCD).

11. A local dimming method adaptable to a backlight of a display, the method comprising:
    receiving an image and estimating a mean value thereof;
    generating a PWM gain value according to the mean value;
    performing on a plurality of the mean values in spatial domain to enhance a plurality of the PWM gain values, thereby generating enhanced PWM gain values;
    detecting scene change according to a histogram mean value;
    performing in temporal domain according to the enhanced PWM gain values and a result of scene change detection, thereby generating PWM values;
    performing light shape imitation (LSI) computation according to the PWM values to generate luminance gains; and
    performing pixel compensation on the image according to the luminance gains, thereby resulting in a compensated image;
    wherein the LSI computation is performed by multiplying profile data with corresponding PWM values, and adding products of multiplication, thus resulting in a light shape.

12. The method of claim 11, further comprising:
    subjecting the light shape to interpolation, thus resulting in an interpolated light shape.

13. The method of claim 12, wherein the interpolation comprises Bicubic interpolation.

14. The method of claim 12, further comprising:
    subjecting the interpolated light shape to Gamma mapping, thus resulting in an imitated light shape.

15. The method of claim 11, wherein the backlight comprises a light-emitting diode (LED) backlight.

16. The method of claim 15, wherein the profile data is illumination irradiated by one LED of the LED backlight.

17. The method of claim 11, wherein the LSI computation is down sampled.

18. The method of claim 11, wherein the light shape is restricted to a predetermined area, instead of entire backlight.

19. The method of claim 18, wherein the light shape is restricted by a filter.

20. The method of claim 11, wherein the display comprises a liquid crystal display (LCD).

* * * * *